Sept. 7, 1937.                  C. N. CROSS                    2,092,348
                         PICTURE MOUNT OR THE LIKE
                            Filed Aug. 14, 1936
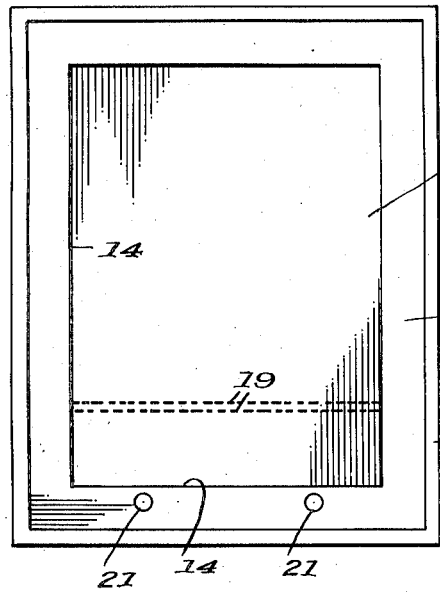
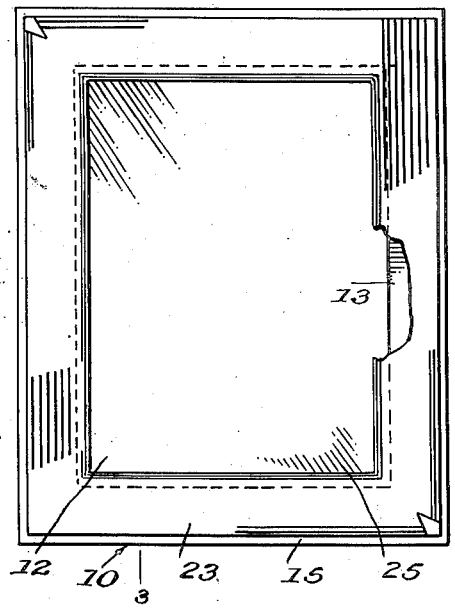
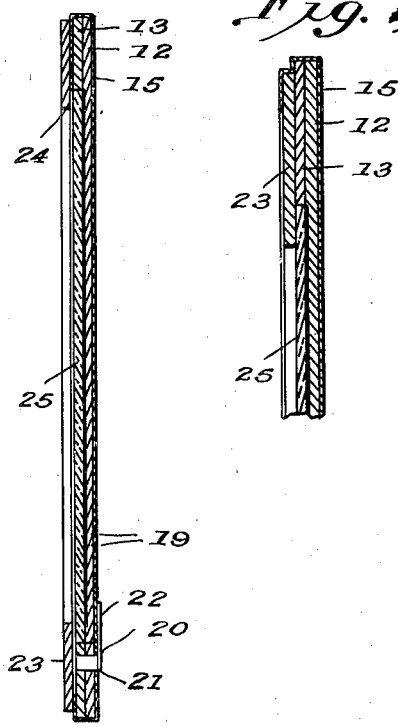
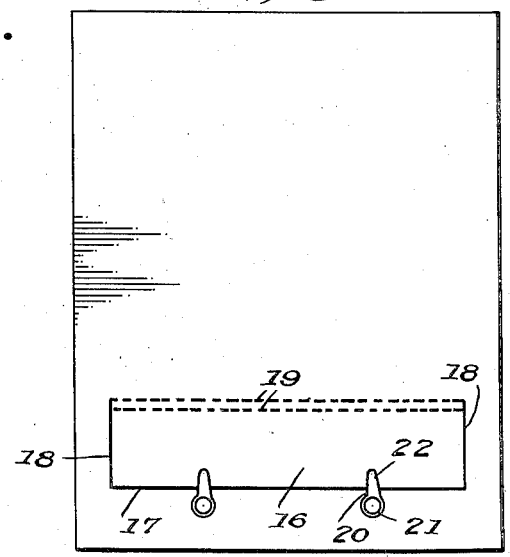
Inventor
CARROLL N. CROSS Patented Sept. 7, 1937

2,092,348

UNITED STATES PATENT OFFICE 2,092,348

PICTURE MOUNT OR THE LIKE

Carroll N. Cross, Middleboro, Mass.

Application August 14, 1936, Serial No. 96,074

6 Claims. (Cl. 40—152)

This invention relates to picture or photograph frames or mounts and it is an object of this invention to produce a sturdy mount which will seal a picture therein against damage from dust and dirt.

It is a further object of the invention to provide a picture mount having a degree of flexibility that will overcome objections to similar devices now in use by eliminating the stress and strain produced by the insertion and enclosure of a picture therein.

A further and more specific object of the invention is to provide a mount of the class described which is entirely closed along its four marginal edges and which, while providing ample means for inserting and removing pictures, is nevertheless tightly sealed against the passage of dirt and dust into its interior.

These and further objects will be more fully explained in the following specification or will become evident from a reading thereof in view of the drawing in which:

Fig. 1 is a face view of a mount with the face-board removed;

Fig. 2 is a face view of a complete mount with a portion of the face-board broken away to show underlying structure;

Fig. 3 is a sectional view on line 3—3 of Fig. 2;

Fig. 4 is a view similar to Fig. 3, but showing a modification in the structure; and Fig. 5 is a view taken from the back of a mount to show the means provided for inserting a picture.

The mount, generally indicated at 10, comprises a backboard 12 and a marginal spacing board 13, the outer marginal edges of which are coincident with the outer marginal edges of the backboard 12. The marginal spacing member 13 is cut out along the lines 14 for the purpose of providing a picture and glass receiving well or opening.

The backboard 12 and the marginal spacing member 13 are superimposed upon each other and are bound together by means of a flexible covering member 15, which may extend over the entire rear surface of the backboard 12, over the four marginal edges of the backboard 12 and over the edges of the marginal spacing member 13. Furthermore the flexible binding member 15 extends over at least a portion of and is attached to the front face of the marginal spacing member 13.

A picture inserting opening is formed in the backboard 10 by providing a flap portion 16 formed by cutting through the backboard along the line 17 and along the parallel lines 18. In order to impart greater flexibility to the flap member 16 and to permit it to be opened more readily without damaging the backboard, a series of score lines 19 running parallel to the line 17 and extending between the parallel lines 18 may be provided.

The flap 16 is adapted to be held in closed position by means of one or more latches 20, comprising a latch grommet 21 and a latch finger 22. The grommet may extend through the backboard only, or if desired it may extend through both the backboard 10 and the marginal spacing member 13.

An ornamented facing member 23 provided with a picture display window and having margins of slightly less extent than those of the backboard and the marginal spacing member, is affixed to the marginal spacing member 13 by gluing or other suitable means. It will be observed that the margin of the facing member 23 extends over the inner edge of the binding member 15. Furthermore, the margins 24 of the picture display window describe an area smaller than the well in the marginal spacing member 13. Thus is provided means for securely and positively holding a sheet of glass or other transparent medium 25 between the facing member 23 and the backboard 12. The transparent medium 25 is adapted to overlie a picture or photograph which may be inserted therebetween and the backboard 12 by using the opening provided for that purpose in the backboard.

In the modification shown in Fig. 4 a greater degree of flexibility is imparted to the mount by extending the binding member 15 over the edge and onto the front face of the facing member 23. Otherwise a mount constructed in accordance with the modification shown in this figure is similar to the principal embodiment of the invention.

It will be understood that the backboard 12, the marginal spacing member 13, and the face member 23, may be made of wood, cardboard, paper stock, composition, wood, metal, celluloid, or other suitable material. Furthermore it is not essential that all three members be constructed of the same material, but it is apparent that they may be constructed of different materials or combinations of materials. Furthermore the face member 23 may be suitably ornamented by printing, stamping, or otherwise, and may be so designed to offer an artistic contrast between it and the portion of the binding member 15 which is visible from the front of the mount. The binding member 15 is preferably of artificial leather or coated paper stock, but may be of any flexible material suitable for the purpose.

While the mount shown in Fig. 4 illustrates a construction in which the face-board 23 is of less dimension than the spacing member 13 and the backboard 12, it is nevertheless obvious that the face-board 23 may be of equal dimensions. Furthermore, while the binding member 15 is shown as extending from the back of the mount over the marginal edges and against the front of the mount, it is clear that the mount in any of its forms may be bound together by placing the binding member on the face-board and extending it over the marginal edges and over only a portion of the backboard 12. In such modified construction it may be desirable to cover the turned over edges of the binding member by adhesively attaching an ornamental paper or artificial leather covering over the backboard.

A very useful modification of the invention consists in joining a backboard, a spacing member, and a face-board of equal outside dimensions by means of a flexible binding member as hereinabove described, and by thereafter attaching to the face-board a separate super-face-board similar to the member 23 shown in the drawing. The appearance of the mount may be enhanced by forming such super-face-board of smaller marginal dimensions than the base of the mount and with a cut-out of larger dimensions than the picture display window in the face-board. The edges of the super-face-board may be deckled and the outer surface thereof may be suitably ornamented, although such modification may lie within the requirement of the manufacturer.

A further embodiment of the invention which is not disclosed in the drawing but which may be evident to those reading this specification, consists in joining a face-board 23 to a spacing member 13 by means of the adhesively attached binding 15 which may be placed on these two members from front to back, that is to say, by entirely or partially covering the face-board with the binding member, turning the same over the four marginal edges of the members to be joined, and attaching the edges of the binding member to the back of the spacing member. In this practice of the invention the face-board is then cut out to provide a picture display opening, and the spacing member thus joined with the face-board is glued to a backboard, preferably of larger marginal dimensions. In this form of the invention it is also desirable, although not necessary, to cover the rear surface of the backboard with an ornamental covering such as artificial leather or the like.

It will be seen from the above description that by the practice of this invention may be produced a picture frame or mount which is tightly sealed against the passage of dirt and dust to the interior thereof. Furthermore, the flexibility obtained by relatively loosely superimposing the several elements comprising the mount, and binding these together by means of a flexible binding member passing over the edges, eliminates stress placed on the mount by the insertion and enclosure of a picture, thereby overcoming serious objections to devices of the same class now in use.

It will be obvious that certain modifications and changes may be made in the practice of this invention, and it is therefore desired to include such modifications which fall within the scope of the subjoined claims.

What I claim is:

1. In a picture mount or the like constructed of lightweight flexible stock, a backboard, a spacing member having therein a well for receiving a picture or the like, a flexible binding member terminating on the face of said spacing member joining said backboard and said spacing member along their margins only whereby warping of said mount is avoided, a face-board non-coextensive with the margins of said backboard and said spacing member and having therein a display window smaller than said well, and a picture inserting opening in said backboard, the margins of said backboard and said spacing member being substantially coextensive.

2. In a picture mount or the like, a backboard and a coextensive marginal spacing member having a well therein for receiving a picture or the like, a thin flexible ornamental facing material covering the entire rear face of said backboard and extending over the marginal edges of said backboard and said spacing member and over a portion of the outer surface of said spacing member whereby said members are united and sealed about all marginal edges thereof, a non-coextensive ornamented face-board having cut marginal edges and having a picture display window therein of which the marginal edges extend inwardly beyond the inner margins of said spacing member, and means attaching said face-board to said mount whereby the edges of said flexible facing material are concealed.

3. In a picture mount or the like, a backboard, a marginal spacing member associated with said backboard to provide a well for receiving a picture or the like, a flexible binding member disposed about the marginal edges of said backboard and spacing member whereby said members are united and sealed about all marginal edges thereof, a fastening member extending through said backboard and spacing member, a face-board extending over the penetrating portion of said fastening member and having a display window therein smaller than the said well, means attaching said face-board to the face of said mount whereby the portions of said fastening member extending toward the face of said mount are concealed and a mount closed along its marginal edges is provided.

4. In a picture mount or the like, a backboard, a marginal spacing member associated with said backboard to provide a well for receiving therein a picture or the like, a flexible binding member disposed about the marginal edges of said backboard and spacing member whereby said members are sealed and united about all marginal edges thereof, an aperture in said backboard, a closure for said aperture, a closure fastener including a support extending through said backboard and said spacing member, a face-board extending over the penetrating portion of said fastener and having a display window therein substantially smaller than said well, means attaching said face-board to the face of said mount whereby the closure fastener support extending through said spacing member is concealed and a mount closed along its marginal edges is provided.

5. In a picture mount or the like, a backboard and a co-extensive marginal spacing member having a well therein for receiving a picture or the like, a thin flexible ornamental facing material covering the entire rear face of said backboard and extending over the marginal edges of said backboard and said spacing member and over a portion of the outer surface of said spacing member whereby said members are united, an aperture in said backboard, a closure for said aperture, a closure fastener including a support extending through said backboard and said spacing member, a non-coextensive face-board extending over the penetrating portion of said fastener support and having a picture display window therein of which the marginal edges extend inwardly beyond the inner margins of said spacing member, and means attaching said face-board to said mount whereby the edges of said flexible facing material and the closure fastener support extending through spacing member are concealed.

6. In a picture mount or the like constructed of lightweight, flexible stock, a backboard, a spacing member having therein a well for receiving a picture or the like, a flexible binding member terminating on the face of said spacing member sealing said backboard and said spacing member along their margins, a face-board covering the free edges of said flexible binding member and having therein a display window smaller than said well, and a picture inserting opening in said backboard, the margins of said backboard and said spacing member being substantially coextensive.

CARROLL N. CROSS.